US011062494B2

(12) United States Patent
Orvalho et al.

(10) Patent No.: US 11,062,494 B2
(45) Date of Patent: Jul. 13, 2021

(54) ELECTRONIC MESSAGING UTILIZING ANIMATABLE 3D MODELS

(71) Applicant: Didimo, Inc., Oporto (PT)

(72) Inventors: Verónica Costa Teixeira Pinto Orvalho, Oporto (PT); Hugo Miguel dos Reis Pereira, Oporto (PT); José Carlos Guedes dos Prazeres Miranda, Oporto (PT); Eva Margarida Ferreira de Abreu Almeida, Oporto (PT)

(73) Assignee: Didimo, Inc., Oporto (PT)

( * ) Notice: Subject to any disclaimer, the term of this patent is extended or adjusted under 35 U.S.C. 154(b) by 0 days.

(21) Appl. No.: 16/289,363

(22) Filed: Feb. 28, 2019

(65) Prior Publication Data

US 2019/0279410 A1    Sep. 12, 2019

Related U.S. Application Data

(60) Provisional application No. 62/639,459, filed on Mar. 6, 2018.

(51) Int. Cl.
*G06T 13/40* (2011.01)
*H04L 12/58* (2006.01)
(Continued)

(52) U.S. Cl.
CPC .............. *G06T 13/40* (2013.01); *G06F 3/012* (2013.01); *G06F 3/013* (2013.01);
(Continued)

(58) Field of Classification Search
CPC .......................... G06T 13/40; G06K 9/00315
See application file for complete search history.

(56) References Cited

U.S. PATENT DOCUMENTS 10,379,719 B2 * 8/2019 Scapel ................ G06F 3/04842
10,796,468 B2   10/2020 Orvalho et al.
(Continued)

FOREIGN PATENT DOCUMENTS

EP     3759692A1 A1    1/2021
WO   WO2019162420 A1   8/2019
(Continued)

OTHER PUBLICATIONS

"Morph target animation." Wikipedia, Retrieved from "https://en.wikipedia.org/wiki/Morph_target_animation", Aug. 29, 2019.
(Continued)

*Primary Examiner* — Samantha (Yuehan) Wang
(74) *Attorney, Agent, or Firm* — Carr & Ferrell LLP

(57) ABSTRACT

Dynamically customized animatable 3D models of virtual characters ("avatars") in electronic messaging are provided. Users of instant messaging are represented dynamically by customized animatable 3D models of a corresponding virtual character. An example method comprises receiving input from a mobile device user, the input being an audio stream and/or an image/video stream; and based on an animatable 3D model and the streams, automatically generating a dynamically customized animatable 3D model corresponding to the user, including performing dynamic conversion of the input into an expression stream and corresponding time information. The example method includes generating a link to the expression stream and corresponding time information, for transmission in an instant message, and causing display of the customized animatable 3D model. Link generation and causing display is performed automatically or in response to user action. The animatable 3D model can be customized in the cloud or downloaded for customization.

24 Claims, 10 Drawing Sheets

(51) Int. Cl.
*G06F 3/01* (2006.01)
*G06K 9/00* (2006.01)

(52) U.S. Cl.
CPC ..... *G06K 9/00248* (2013.01); *G06K 9/00315* (2013.01); *H04L 51/04* (2013.01); *H04L 51/10* (2013.01)

(56) References Cited

U.S. PATENT DOCUMENTS

| | | | |
|---|---|---|---|
| 2003/0137515 | A1 | 7/2003 | Cederwall et al. |
| 2009/0055190 | A1 | 2/2009 | Filev et al. |
| 2009/0135176 | A1 | 5/2009 | Snoddy et al. |
| 2010/0007665 | A1* | 1/2010 | Smith ............... G06T 13/40 345/473 |
| 2010/0149177 | A1* | 6/2010 | Miller ............. G06K 9/00208 345/419 |
| 2011/0175921 | A1 | 7/2011 | Havaldar et al. |
| 2011/0267344 | A1 | 11/2011 | Germann et al. |
| 2014/0043329 | A1 | 2/2014 | Wang et al. |
| 2014/0085293 | A1 | 3/2014 | Konoplev et al. |
| 2015/0215249 | A1* | 7/2015 | Bruns-Bielkowicz ................ H04L 51/10 709/206 |
| 2015/0287403 | A1* | 10/2015 | Holzer Zaslansky ................ G06T 13/205 704/231 |
| 2016/0088284 | A1 | 3/2016 | Sareen et al. |
| 2016/0148435 | A1 | 5/2016 | Li et al. |
| 2017/0053663 | A1 | 2/2017 | Yu et al. |
| 2017/0365231 | A1 | 12/2017 | Rider et al. |
| 2017/0372505 | A1 | 12/2017 | Bhat et al. |
| 2018/0018787 | A1 | 1/2018 | Giancola et al. |
| 2018/0054466 | A1* | 2/2018 | Blattner ............ H04L 12/1822 |
| 2018/0139436 | A1 | 5/2018 | Yucer et al. |
| 2018/0336737 | A1 | 11/2018 | Varady et al. |
| 2019/0035131 | A1 | 1/2019 | Hutchinson et al. |
| 2019/0035149 | A1 | 1/2019 | Chen et al. |
| 2019/0266773 | A1 | 8/2019 | Orvalho et al. |
| 2021/0012550 | A1 | 1/2021 | Orvalho et al. |
| 2021/0065420 | A1 | 3/2021 | Orvalho et al. |

FOREIGN PATENT DOCUMENTS

| | | |
|---|---|---|
| WO | WO2019173108 A1 | 9/2019 |
| WO | WO2021040896A1 A1 | 3/2021 |

OTHER PUBLICATIONS

Orvalho et al., "Automatic Rig Creation Process", U.S. Appl. No. 15/905,667, filed Feb. 26, 2018, pp. 1-35.

Orvalho et al., "A Facial Rigging Survey", Eurographics: STAR—State of The Art Report, 2012, 22 pages.

Ichim et al., "Dynamic 3D Avatar Creation from Hand-help Video Input", ACM Transactions on Graphics, Jul. 27, 2015, 14 pages.

"Invitation to Pay Additional Fees", Patent Cooperation Treaty Application No. PCT/EP2019/054390, dated Mar. 27, 2019, 17 pages.

Dutreve et al., "Easy rigging of face by automatic registration and transfer of skinning parameters", Inernational Conference on Computer Vision and Graphics, Apr. 3, 2017, 9 pages.

"International Search Report" and "Written Opinion of the International Searching Authority," Patent Cooperation Treaty Application No. PCT/US2019/020140, dated May 17, 2019, 8 pages.

"International Search Report" and "Written Opinion of the International Searching Authority," Patent Cooperation Treaty Application No. PCT/EP2019/054390, dated May 22, 2019, 17 pages.

"Category:Line drawings of facial expressions", Wikimedia Commons, Retrieved from "https://commons.wikimedia.org/w/index.php?title=Category:Line_drawings_of_facial_expressions&oldid=329552043", Nov. 27, 2018, 11 pages.

"International Search Report" and "Written Opinion of the International Searching Authority," Patent Cooperation Treaty Application No. PCT/US2020/041674, dated Nov. 3, 2020, 10 pages.

* cited by examiner

Joy + Surprise = Amazed

Disgust + Fear = Horror (Frightened)

Expanding to 3 bases
Disgust + Fear + Surprise = Shocked

ELECTRONIC MESSAGING UTILIZING ANIMATABLE 3D MODELS

CROSS-REFERENCE TO RELATED APPLICATIONS

This application claims the benefit of U.S. Provisional Patent Application No. 62/639,459, filed Mar. 6, 2018, and is related to U.S. Nonprovisional patent application Ser. No. 15/905,667, filed Feb. 26, 2018, which applications are incorporated by reference in their entirety herein.

FIELD

The present technology relates generally to electronic communication, and more specifically to electronic messaging and an animatable 3D model for more personalization of the electronic messaging.

BACKGROUND

The approaches described in this section could be pursued, but are not necessarily approaches previously conceived or pursued. Therefore, unless otherwise indicated, it should not be assumed that any of the approaches described in this section qualify as prior art merely by virtue of their inclusion in this section.

Electronic messaging, particularly instant messaging, is a popular form of communication, given the ubiquitous availability of computing devices, and more specifically, mobile devices. Users often use "emoji" (e.g., ideograms and icons) within electronic messages such as texts, reflecting a global demand to communicate more visually. However, conventional emoji and similar graphics are typically generic and leave much to be desired in terms of personalization for electronic communication.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to various embodiments, the present disclosure is directed to a method for creating a customized animatable 3D model for use in an electronic communication between at least two users, the method comprising: receiving input from a first user, the first user using a mobile device, the input being in the form of at least one of an audio stream and a visual stream, the visual stream including at least one image or video; and based on an animatable 3D model and the at least one of the audio stream and the visual stream, automatically generating a dynamically customized animation of the animatable 3D model of a virtual character corresponding to the first user, the generating of the dynamically customized animation comprising performing dynamic conversion of the input, in the form of the at least one of the audio stream and the visual stream, into an expression stream and corresponding time information. The method may further include generating a selectable link for transmission as part of an electronic message, the selectable link linking to the expression stream and the corresponding time information; and causing display of the dynamically customized animatable 3D model to the second user. The generating of the selectable link and the causing display may be automatically performed or performed in response to user action.

According to various embodiments, the present disclosure is also directed to a system for creating a customized animatable 3D model for use in an electronic message, the system comprising: a processor; and a memory for storing executable instructions, the processor executing the instructions to: receive input from a first user, the first user using a mobile device, the input being in the form of at least one of an audio stream and a visual stream, the visual stream including at least one image or video; based on an animatable 3D model and the at least one of the audio stream and the visual stream, automatically generate a dynamically customized animation of the animatable 3D model of a virtual character corresponding to the first user, the generating of the dynamically customized animation comprising performing dynamic conversion of the input, in the form of the at least one of the audio stream and the visual stream, into an expression stream and corresponding time information. The processor may further execute the instructions to: generate a selectable link for transmission as part of an electronic message, the selectable link linking to the expression stream and the corresponding time information; and cause display of the dynamically customized animatable 3D model to the second user.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example, and not by limitation in the figures of the accompanying drawings, with like references indicating similar elements.

DETAILED DESCRIPTION

Figure 1:
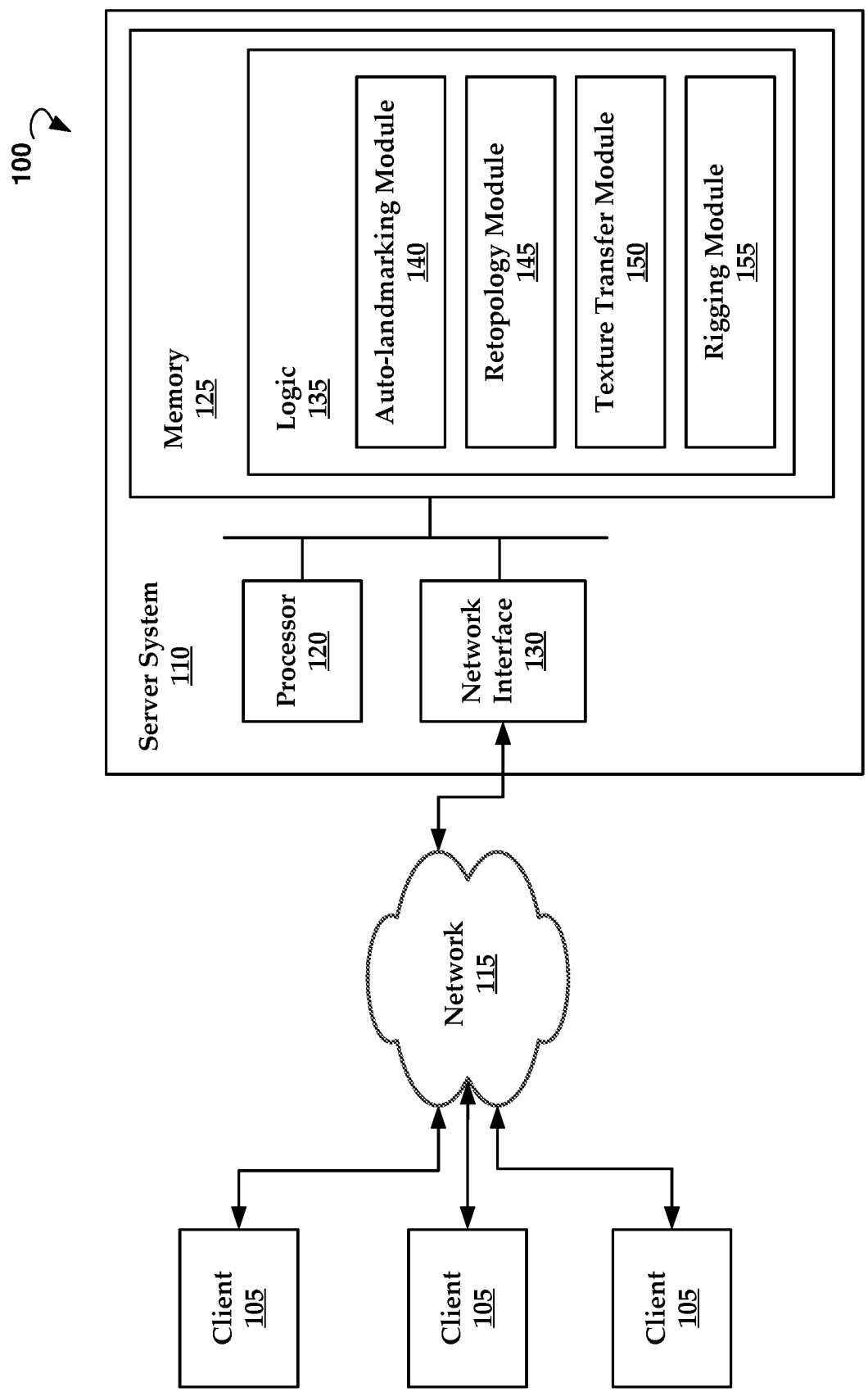
FIG. 1 is a schematic diagram of an example system architecture for practicing aspects of the present disclosure.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

Electronic messaging, especially instant messaging, has become an increasingly popular means of human communication. In some instances, electronic messaging has replaced in-person communication. There is a need in the art to replicate the intimacy of in-person communication, and various embodiments of the present disclosure addresses this by introducing customized animatable 3D models that have facial expressions that mimic those of their respective users.

Facial expressions play a crucial role in human communication and interaction. As such, the replication and utilization of such facial expressions in animatable 3D models of virtual characters in electronic messaging is important.

Various embodiments of the present disclosure also include novel automatic real-time facial features extraction methodologies that accurately detect and reflect the facial emotions of the user that an animatable 3D model of a virtual character represents. Various embodiments address this and other issues, by introducing the use of animatable 3D models of virtual characters (also known as "avatars") in electronic messaging. Users of the electronic messaging can be represented by the animatable 3D models.

In general, various embodiments of the present disclosure are directed to solutions for generating electronic messages (particularly instant messages) utilizing an animatable 3D model of a virtual character, the animatable 3D model representing a user of the electronic messaging. These and other advantages of the present disclosure are provided herein in greater detail with reference to the drawings In various embodiments, the animatable 3D model that is utilized is as disclosed in related and commonly owned U.S. patent application Ser. No. 15/905,667, in which an animatable 3D model of a virtual character is a computer graphic representation having a geometry or mesh, which may be controlled by a rig or control structure. The rig or control structure may attach to areas of the mesh, and affect those areas of the mesh in accordance to geometric operations applied. Such 3D models can include 3D facial models. Since each face is unique, in various embodiments, a mesh and rig of each 3D facial model must be individually customized for the particular desired facial structure.

Portions of U.S. patent application Ser. No. 15/905,667 are included below to set the stage for the more detailed description of generating customized animatable 3D models for the electronic messaging, e.g., instant messaging context.

FIG. 1 illustrates an exemplary architecture 100 for practicing aspects of the present disclosure. The architecture 100 comprises one or more clients 105 communicatively coupled to a server system 110 via a public or private network, such as network 115. In various embodiments, the client 105 includes at least one of a personal computer, a laptop, a Smartphone, or other suitable computing device.

Suitable networks for network 115 may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 115 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

Generally, the server system 110 is configured to provide various functionalities which are described in greater detail throughout the present disclosure. In various embodiments, the server system 110 comprises a processor 120, a memory 125, and network interface 130. According to some embodiments, the memory 125 comprises logic 135 (otherwise referred to as instructions) that may be executed by the processor 120 to perform various methods described herein. For example, the logic 135 may include auto-landmarking module 140, retopology module 145, texture transfer module 150, and rigging module 155, which are configured to provide some or all of the functionalities described in greater detail herein. It is to be understood that, while the methods described herein are generally attributed to the server system 110, may also be executed by the client 105. In other embodiments, the server system 110 and client 105 may cooperate to provide the functionalities described herein. The client 105 may be provided with a client-side application that interacts with the server system 110 in a client/server relationship.

In general, the auto-landmarking module 140 may receive user input, for example in the form of a 2D image or 3D data associated with a face or head of a person, from the client 105. The auto-landmarking module 140 may automatically detect facial features (e.g. landmarks) from the user input, which are unique to the face associated with the user input. In various embodiments, the automatic detection of facial features is based on machine learning algorithms on an associated database. In some embodiments, the auto-landmarking module 140 casts 2D coordinates of the detected facial features from a 2D input into 3D coordinates (e.g. spatial coordinates) associated with a template geometry.

In one or more embodiments, the retopology module 145 automatically deforms, based on the detected facial features, the template geometry to create a custom geometry. The template geometry may have a pre-defined set of facial features with associated coordinates. In general, vertices of the custom geometry follow a morphology of the original face associated with the user input.

In some embodiments, the texture transfer module 150 determines a texture from the user input. In general, the texture transfer module 150 uses the user input as the texture, such as the 2D image or surface information of 3D input data. The texture transfer module 150 may match the texture to the custom geometry created by the retopology module. In general, the texture is not modified—for example, no resampling is performed and no average is performed of the deformed space in any database. Advantageously, the custom geometry has already been deformed to match the texture given in the user input. The texture transfer module 150 may automatically map the texture to the custom geometry by associating each pixel in the user input to a corresponding vertex or surface on the custom geometry.

In some embodiments, the transferred texture is configured to adapt to an environment of the 3D model, for example, to adjust by normalization and light illumination and context.

In various embodiments, the rigging module 155 automatically generates a custom control structure based on the detected facial features. The control structure generally provides elements that allow manipulation of the custom geometry to create animation. The control structure may adapt and create key elements to deform the custom geometry during animation such that behaviors and movements are smooth and follow the morphology of the face associated with the user input. In particular, in some embodiments, the rigging module 155 deforms a template control structure based on control elements determined from the detected facial features. In general, the texture transfer module 150 and the rigging module 155 may operate in series or in parallel.

The server system 110 may then combine the custom geometry, the transferred texture, and the custom control structure to automatically generate the animatable 3D model. Thus, the final output may include accurate landmark detection, an accurate custom geometry that follows a morphology of the face associated with the user input, accurate texture mapping, and a custom control structure that allows smooth and accurate simulation of behavior and movement of the 3D model.

Another aspect of the present disclosure is that the server system 110 may utilize any template, or pre-defined, geometry and any template, or pre-defined, control structure. For example, the user may input, via the client 105, a user-defined geometry, which includes a pre-defined set of facial features with associated coordinates, to replace the template geometry in the server system 110. Likewise, the user may input, via the client 105, a user-defined control structure to replace the template control structure used by the rigging module 155 to generate the custom control structure.

Figure 2:
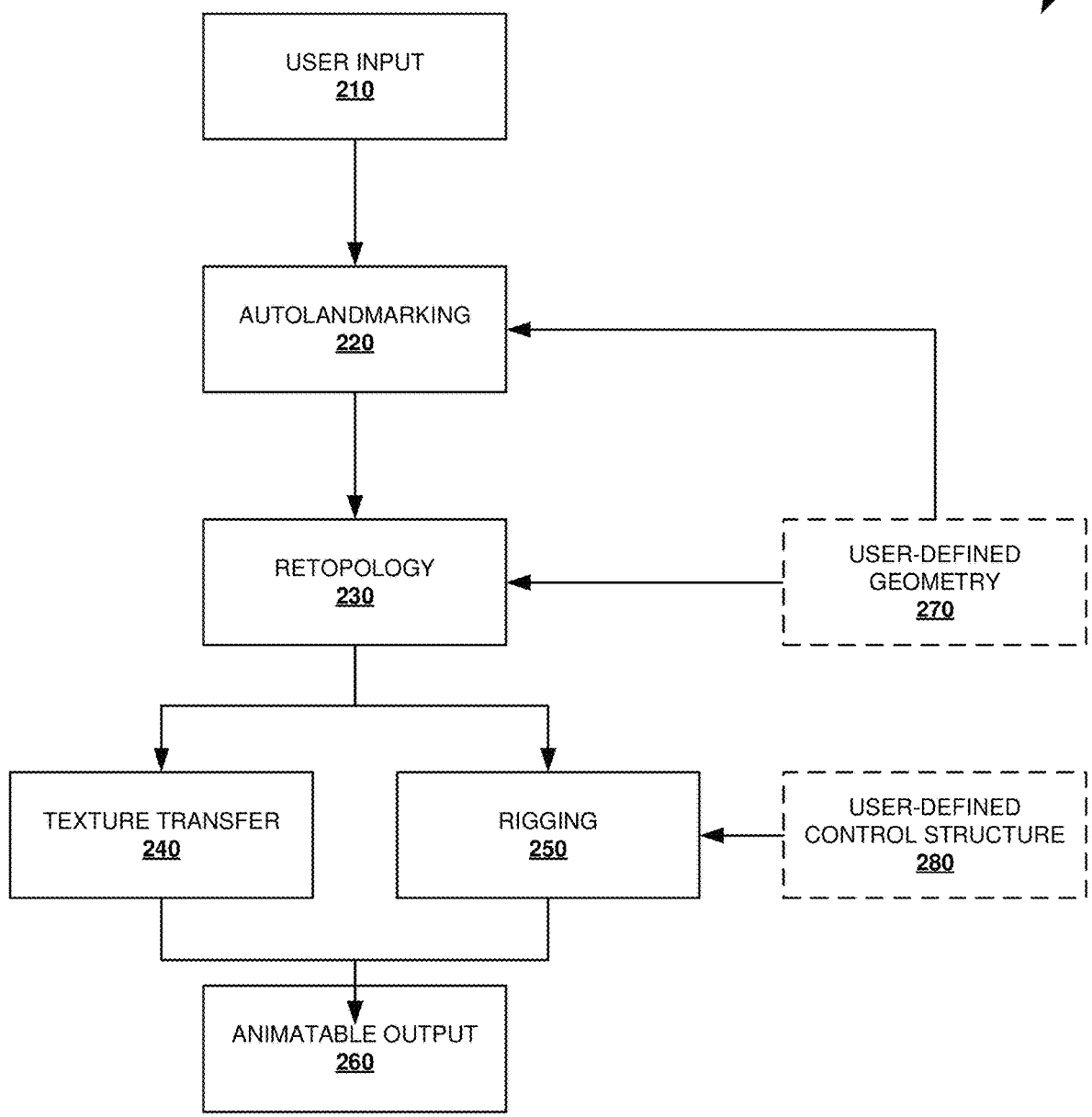
FIG. 2 is a block diagram for automatically generating an animatable object, according to some embodiments.

FIG. 2 depicts a block diagram of a system 200 for automatically generating a custom animatable object, according to embodiments of the present disclosure.

At block 210, user input is received that is indicative of a face of the user. The user input may be an image, a frame of a video, a 3D scan, or other suitable media. It is to be understood that the user input may further comprise body information of the user. In such embodiments, the template geometry and template control structure would comprise approximations of the appearance and control elements of a humanoid body, and the one or more features detected by auto-landmarking would include further features indicative of the body.

At block 220, auto-landmarking is performed to automatically detect facial features from the user input from block 210. The facial features are unique to the user. If the user input is an image or in another 2D format, the facial features are detected and stored as 2D coordinates, for example those shown and described in FIG. 4. The 2D coordinates are converted into spatial coordinates using ray casting techniques, or other suitable algorithms. For example, the system 200 may include creating an artificial 2D plane, having the user input and detected features, in front of a template 3D model. It is to be understood that the template 3D model may include a template, or generic, geometry and template, or generic, control structure. An origin coordinate is determined based on a spatial position of the user input and the template 3D model. Using ray casting techniques, each detected feature is projected from the artificial 2D plane onto the template 3D model via a ray passing from the origin through the respective 2D coordinate of the detected feature. The projection results in a spatial coordinate indicative of where the detected feature should be for the custom animatable model. The depth of each spatial coordinate, as well as the relative position of the artificial 2D plane, template 3D model, and origin coordinate, may be automatically determined based on predictions and statistics of facial morphology. In other embodiments, the depth of each spatial coordinate is pre-defined in the template geometry.

In various embodiments, the server comprises a template 3D model having a template geometry and a template control structure, also referred to as a pre-defined geometry and a pre-defined control structure, respectively. The template geometry is an approximation of what the resulting facial mesh should look like, although it is to be understood that the template geometry may be any suitable size or shape. The template control structure may be any suitable rig for controlling movement of a geometry, such as a bone-based rig, blend-shape rig, free-form deformer, physically-based model, or other suitable control structure. For example, the template control structure may comprise a pre-defined set of bones that will create facial movements that follow the morphology and behavior a face of the template geometry.

At block 230, retopology is performed to deform the template geometry based on the detected facial features. The template geometry may include a set of template facial features that correspond to facial features detected in the auto-landmarking in block 220. As such, spatial coordinates of the detected facial features are matched to corresponding spatial coordinates of the template facial features. Based on the matching, the template geometry is automatically deformed to create a custom geometry using radial basis functions, or other suitable algorithms. Advantageously, the custom geometry is clean. That is, vertices of the custom geometry follow a morphology of the face from the user input.

In some embodiments, block 230 includes dynamically deforming the template geometry based on a determined type of facial structure associated with the user input. For example, the server may comprise a plurality of template geometries, each template geometry corresponding to a different type of facial structure. The different types of facial structures may relate to different genders or races, for example, and reflect differences in statistical information regarding the facial morphologies of each group. As such, each template geometry may comprise different spatial coordinates for the set of generic facial features. Block 230 may further include determining which template geometry of the plurality of template geometries most closely matches the one or more detected features of the received user input, and using that template geometry.

Likewise, the server may comprise a plurality of template models, each with different parameters for different target applications. For example, a first template model of the template models may be configured with a cinematic rig with a large number of control points and high polygon count, while a second template model of the template models may be configured for a lightweight, non-playable character in a video game with a few control points and a low polygon count. The server may select which template model to use based on user input or automatically.

Block 240 and block 250 may be performed in series or in parallel, as shown in FIG. 2. At block 240, a texture of the user input is transferred to the custom geometry automatically generated in block 230. Transferring the texture may include mapping a plurality of pixels of the user input to vertices of the custom geometry. At block 250, rigging is performed to automatically generate a custom control structure based on the detected facial features and the template control structure. The template control structure may include a pre-defined set of control elements, such as bones in a bone-based rig, associated with spatial coordinates. A subset of the detected facial features may be associated with control elements, herein after referred to as detected control elements of the user input. As such, spatial coordinates of the detected control elements are matched to corresponding spatial coordinates of the template control structure. Based on the matching, the template control structure is automatically deformed to create a custom control structure using radial basis functions, or other suitable algorithms. Advantageously, one or more algorithms used to deform the template control structure may be the same as the one or more algorithms used to deform the template geometry. The custom control structure provides the elements to allow for the manipulation and animation of the custom geometry, and is configured to follow the morphology of the face from the user input.

At block 260, an animatable output is automatically generated from the custom geometry, the transferred texture, and the custom control structure from blocks 230, 240, and 250. Thus, the animatable object comprises a deformable, custom geometry that uses a custom control structure to generate behaviors and movement. The custom geometry, the transferred texture, and the custom control structure are all based on the user input, and thus are personalized to the unique face of the user indicative of the user input. For example, the animatable object may be a 3D model of a humanoid head having the face and morphology of the user. It is to be understood that the same methods may be applied to other physical structures, such as a body of the user. In such embodiments, the template geometry and template control structure would comprise approximations of the appearance and control elements of a humanoid body, and the feature detected by auto-landmarking would include further features indicative of the body.

Advantageously, embodiments of the present disclosure are versatile and allow the user to input a user-defined template geometry and/or a user-defined template control structure, which are then used in the automatic system. If the user wants a mesh with fewer polygons or would like a control structure set up for motion capture instead of keyframe animation, for example, the user may input such a template geometry or template control structure into the system.

At optional block 270, a user-defined geometry is received. The server may store the user-defined geometry and associate the user-defined geometry with the user for future use. At block 230, the system may determine whether a user-defined geometry is stored for the user. Based on the determination, the user-defined geometry is deformed instead of the template geometry using the same methodology. In various embodiments, the system determines whether the user-defined geometry comprises the same features as the template geometry. Based on the determination, the system may dynamically and automatically adjust the features detected during auto-landmarking in block 220, such that the detected features correspond to the features present in the user-defined geometry.

At optional block 280, a user-defined control structure is received. The user-defined control structure may be configured to control the behavior and movement of the user-defined geometry. The server may store the user-defined control structure and associate the user-defined control structure with the user for future use. At block 250, the system may determine whether a user-defined control structure is stored for the user. Based on the determination, rigging is performed to deform the user-defined control structure instead of the template control structure using the same methodology.

In one or more embodiments, the animatable object is dynamically and automatically generated in real-time based on a dynamic user input, for example from a video signal from a camera system. In such embodiments, the system would perform the auto-landmarking, retopology, texture transfer, and rigging steps in real-time to dynamically and automatically generate the custom geometry, transferred texture, and custom control structure. For example, the system may capture features of the user via auto-landmarking of the dynamic user input, and map the features to both the custom geometry and the custom control structure to create the animated 3D model. Control elements of the custom control structure are configured to allow the 3D model to move according to the morphology of the user. Real-time mapping of the features to the control structure allow for smooth manipulation of the custom geometry in real-time.

Figure 3:
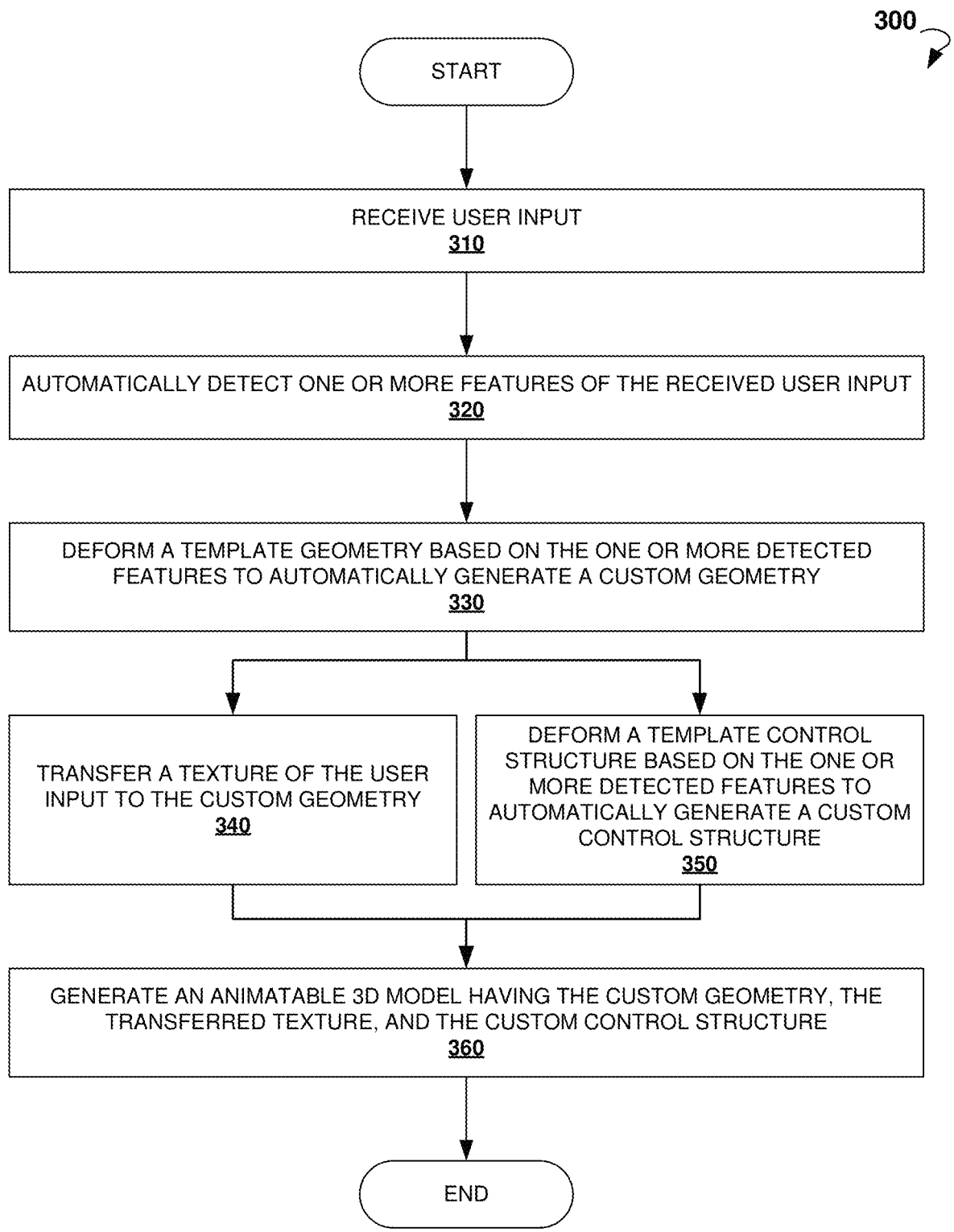
FIG. 3 is a flowchart of an example method for automatically generating an animatable object, according to some embodiments.

FIG. 3 is a flow chart showing an exemplary method 300 for automatic generation of an animatable object. Method 300 can be performed by processing logic that includes hardware (e.g. decision-making logic, dedicated logic, programmable logic, application-specific integrated circuit), software (such as software run on a general-purpose computer system or dedicated machine), or a combination of both. In one example embodiment, the processing logic refers to one or more elements the systems shown in FIGS. 1-2.

Operations of method 300 recited below can be implemented in an order different than described and shown in FIG. 3. Moreover, the method 300 may have additional operations not shown herein, but which can be evident to those skilled in the art from the present disclosure. Method 300 may also have fewer operations than shown in FIG. 3 and described below.

The method 300 may commence in operation 310 with receiving user input indicative of a face. In various embodiments, the user input includes at least one of an image, a video signal, and a 3D scan, which may be indicative of a face and/or body of a user. In certain embodiments, the user input is received from a client device via a network. It is to be understood that each operation of the method 300 may be performed in real-time, such that a dynamic user input such as a video signal is permitted to be input to automatically generate a dynamic 3D model that follows a morphology of the user input in real-time.

Operation 320 includes automatically detecting one or more features of the received user input. The automatically detecting the one or more features may include determining a set of spatial coordinates via ray casting techniques, each spatial coordinate associated with one of the one or more features of the received user input. In one or more embodiments, operation 320 includes casting a two-dimensional coordinate of each of the one or more detected features onto a template geometry using the ray casting techniques.

The method 300 may proceed in operation 330 with deforming a template geometry based on the one or more detected features to automatically generate a custom geometry. In some embodiments, a set of features of the template geometry corresponds to the one or more detected features. The deforming the template geometry may include matching the spatial coordinates of the one or more detected features to the set of features of the template geometry, and based on the matching, applying a radial basis function to the spatial coordinates of the one or more detected features and the set of features of the template geometry. The application of the radial basis function may produce vertices of the custom geometry which are based on the spatial coordinates of the one or more detected facial features.

In certain embodiments, the template geometry is a user-defined geometry received from a client device. The method 300 may further include storing the user-defined geometry as being associated with the client device.

Operation 340 and operation 350 may be performed in parallel, as shown in FIG. 3. Operation 340 may include transferring a texture of the received user input to the custom geometry. In certain embodiments, the transferring the texture to the custom geometry includes automatically mapping at least one pixel of the texture to a corresponding vertex on the custom geometry.

In various embodiments, operation 350 includes deforming a template control structure based on the one or more detected features to automatically generate a custom control structure. A set of control elements of the template control structure may correspond to a subset of the one or more detected features. The deforming the template control structure may include matching the subset of the one or more detected features to the set of control elements of the template control structure, and based on the matching, applying a radial basis function to the subset of the one or more detected features and the set of control elements. The application of the radial basis function may produce control elements of the custom control structure which are based on spatial coordinates of the subset of the one or more detected facial features.

In certain embodiments, the template control structure is a user-defined control structure received from a client device. The method 300 may further include storing the user-defined control structure as being associated with the client device.

At operation 360, an animatable object is automatically generated having the custom geometry, the transferred texture, and the custom control structure.

Figure 4:
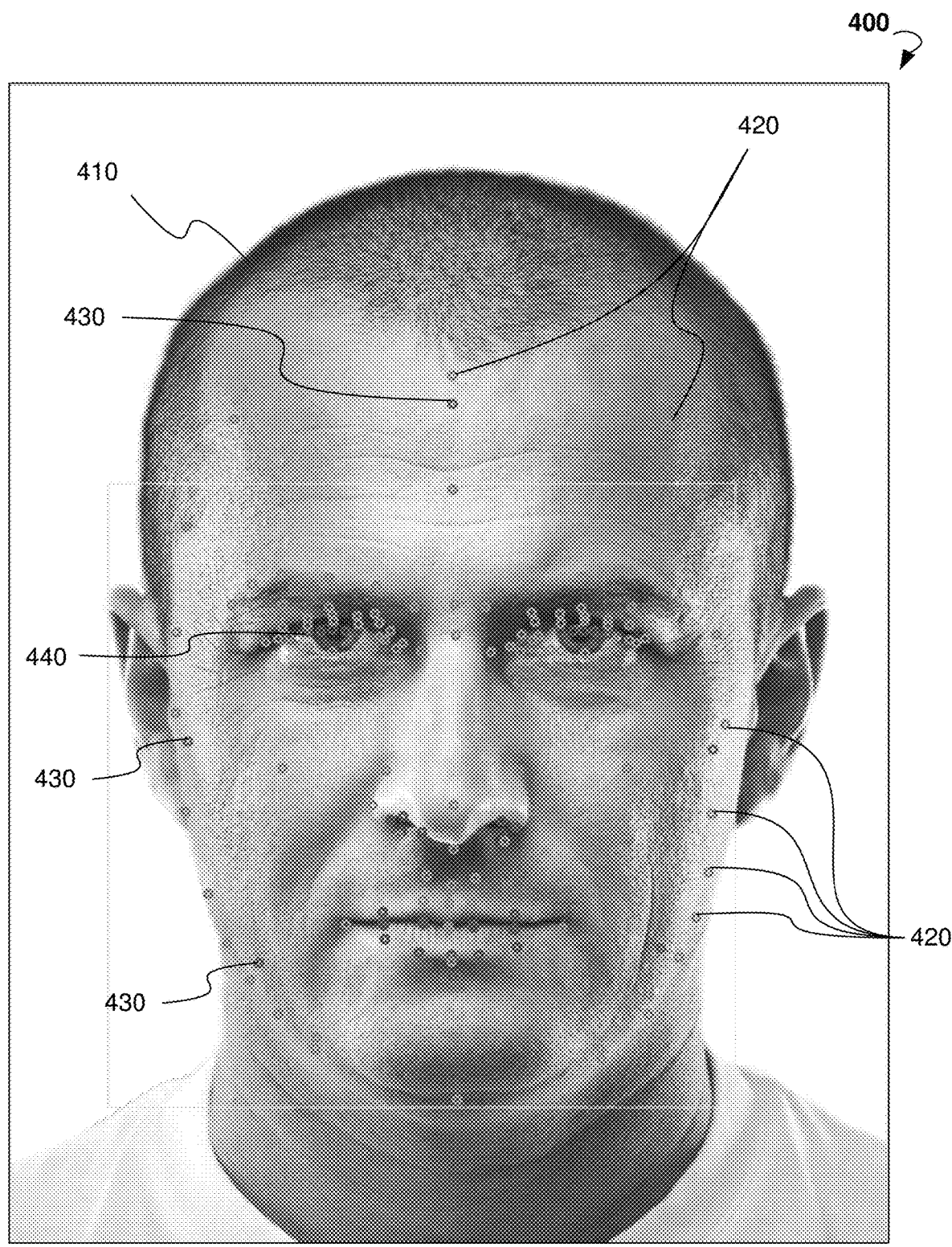
FIG. 4 is an example user input having one or more facial features detected via auto-landmarking.

FIG. 4 is screenshot of an example user input 400 indicative of a user's face 410 having one or more facial features 420, 430, 440 detected via auto-landmarking. Each of the one or more detected facial features 420, 430, 440 is represented by a circle over the user input 400, though for ease of illustration only some of the one or more detected facial features 420, 430, 440 are marked with a reference number. The one or more detected facial features 420, 430, 440 may be described as a set of rules which control the automatic generation of the custom geometry and custom control structure and configure the resulting animatable 3D model to follow the morphology of the face 410. In one or more embodiments, a first set of facial features 420 may be used in the deformation of the template geometry to the custom geometry. A second set of facial features 430 may facilitate alignment and scale, while a third set of facial features 440 may be used to determine coloring (e.g. eye coloring). In such an example, the set of facial features for only one eye may be necessary to determine the eye color. It is to be understood that the identification of any particular detected facial feature 420, 430, 440 in FIG. 4 is exemplary and different combinations of detected facial features, and designation of the type of detected facial features, are contemplated by the present disclosure.

Figure 5:
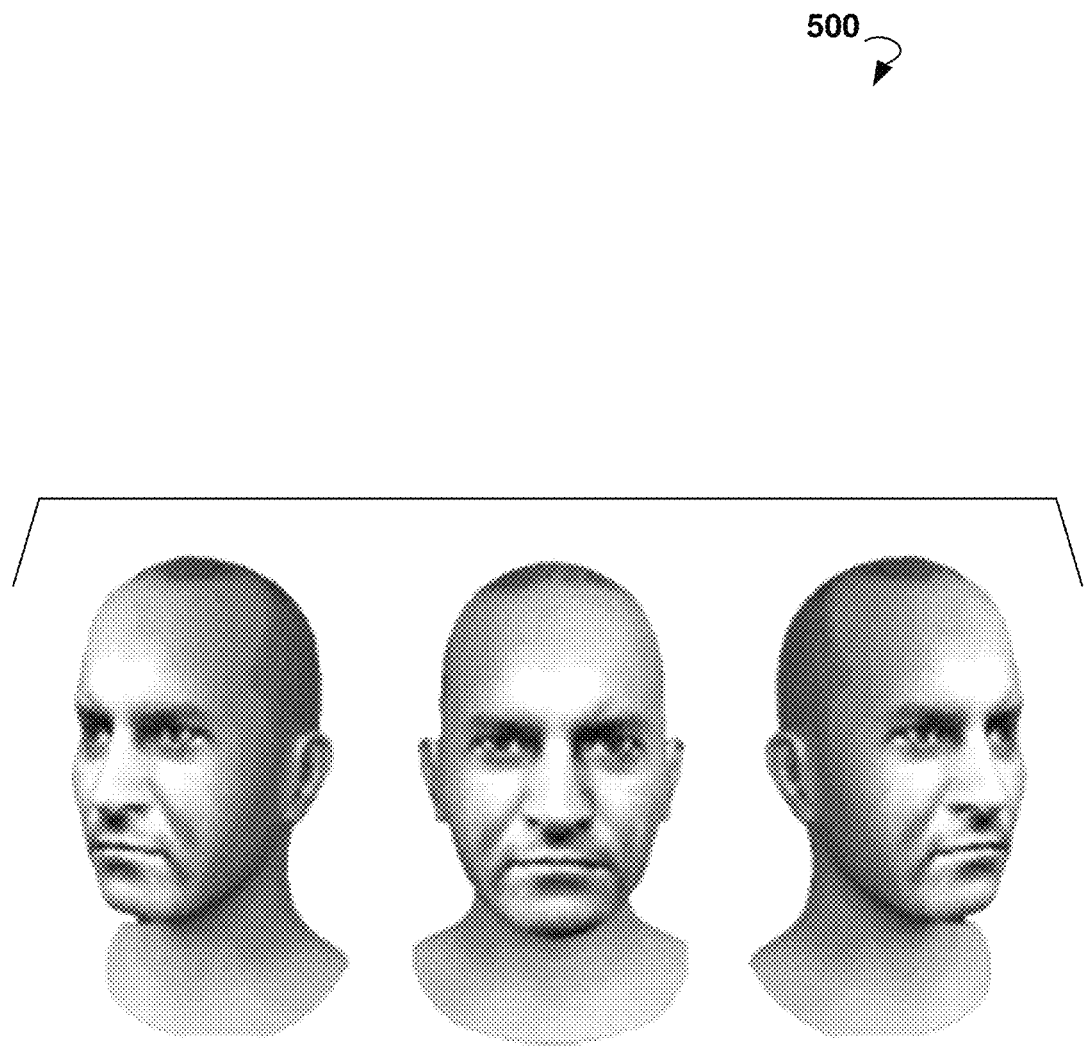
FIG. 5 is a rendering of an exemplary animatable 3D model created from the example user input of FIG. 4.

FIG. 5 illustrates exemplary animatable objects created from the methods described in commonly owned U.S. patent application Ser. No. 15/905,667. FIG. 5 is a rendering of an exemplary animatable 3D model 500 created from the example user input 400 of FIG. 4.

Various embodiments for the present disclosure will now be described in further detail.

Figure 6:
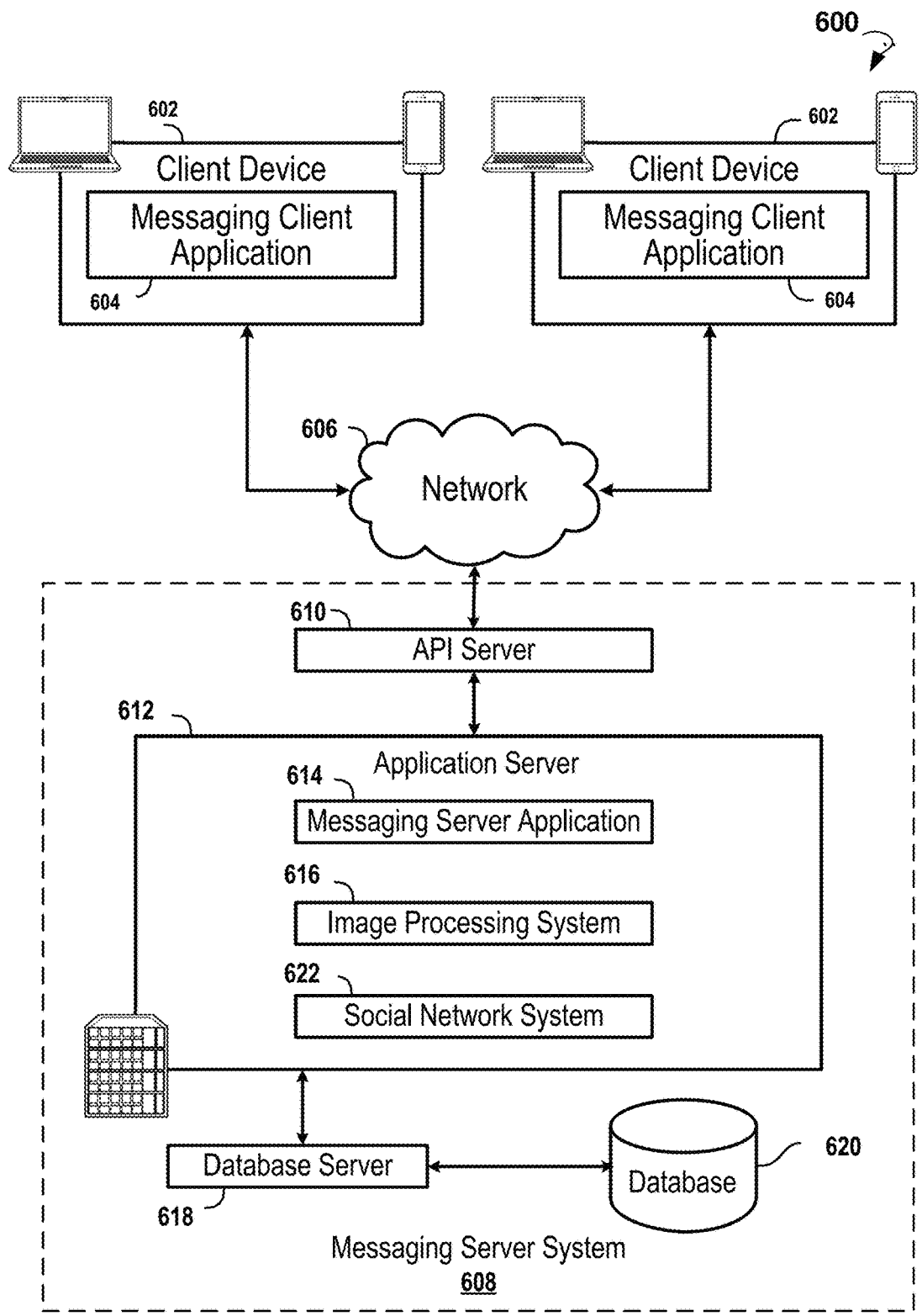
FIG. 6 is a block diagram showing an example messaging system for exchanging data (e.g., messages) over a network.

FIG. 6 is a block diagram showing an example messaging system 600 for exchanging data (e.g., messages) over a network. The messaging system 600 may include multiple client devices 602, each of which hosts a number of applications including a messaging client application 604. Each messaging client application 604 may be communicatively coupled to other instances of the messaging client application 604 and a messaging server system 608 via a network 606 (e.g., the Internet). As used herein, the term "client device" may refer to any machine that interfaces to a communications network (such as network 606) to obtain resources from one or more server systems or other client devices. A client device may be, but is not limited to, a mobile phone, smart watch, desktop computer, laptop, portable digital assistants, smart phones, tablets, ultrabooks, netbooks, laptops, multi-processor systems, microprocessor-based or programmable consumer electronics, game consoles, set-top boxes, or any other communication device that a user may use to access a network.

In the example shown in FIG. 6, each messaging client application 604 is able to communicate and exchange data with another messaging client application 604 and with the messaging server system 608 via the network 606. The data exchanged between messaging client applications 604, and between a messaging client application 604 and the messaging server system 608, may include functions (e.g., commands to invoke functions) as well as payload data (e.g., text, audio, video or other multimedia data).

Suitable networks for network 606 may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 606 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. A network or a portion of a network may include a wireless or cellular network and the coupling may be a CDMA connection, a GSM connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including third generation wireless (3G) networks, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 608 may provide server-side functionality via the network 606 to a particular messaging client application 604. While certain functions of the messaging system 600 are described herein as being performed by either a messaging client application 604 or by the messaging server system 608, it will be appreciated that the location of certain functionality either within the messaging client application 604 or the messaging server system 608 is a design choice. For example, it may be technically preferable to initially deploy certain technology and functionality within the messaging server system 608 or a cloud-based vendor's system, but to later migrate this technology and functionality to the messaging client application 604 where a client device 602 has a sufficient processing capacity.

The messaging server system 608 can support various services and operations that are provided to the messaging client application 604. Such operations include transmitting data to, receiving data from, and processing data generated by the messaging client application 604. This data may include, message content, client device information, geolocation information, media annotation and overlays, message content persistence conditions, social network information, and live event information, as examples. Data exchanges within the messaging system 600 are invoked and controlled through functions available via user interfaces (UIs) of the messaging client application 604.

Turning now specifically to the messaging server system 608, an Application Program Interface (API) server 610 may be coupled to, and provide a programmatic interface to, an application server 612. The application server 612 may be communicatively coupled to a database server 618, which facilitates access to a database 620 in which is stored data associated with messages processed by the application server 612.

Dealing specifically with the Application Program Interface (API) server 610, this server receives and transmits message data (e.g., commands and message payloads) between the client device 602 and the application server 612. Specifically, the Application Program Interface (API) server 610 provides a set of interfaces (e.g., routines and protocols) that can be called or queried by the messaging client application 604 in order to invoke functionality of the application server 612. The Application Program Interface (API) server 610 exposes various functions supported by the application server 612, including account registration, login functionality, the sending of messages, via the application server 612, from a particular messaging client application 604 to another messaging client application 604, and the sending of media files (e.g., images) from a messaging client application 604 to the messaging server application 614.

The application server 612 hosts a number of applications and subsystems, including a messaging server application 614, an image processing system 616 and a social network system 622. The messaging server application 614 implements a number of message processing technologies and functions, particularly related to the aggregation and other processing of content (e.g., textual and multimedia content including images) included in messages received from multiple instances of the messaging client application 604. Other processor and memory intensive processing of data may also be performed server-side by the messaging server application 614, in view of the hardware requirements for such processing.

In various embodiments, the method detects micro expressions in the face of a user; produce a mix of expressions based on facial movements detected in the face of a user, an image of the face captured by a camera (or other sensor) on a user device; and detect the intensity of an expression on the face of a user, or apply an intensity to an expression that is provided to the animatable 3D model to customize it as a dynamic 3D avatar for the user.

Figure 7:
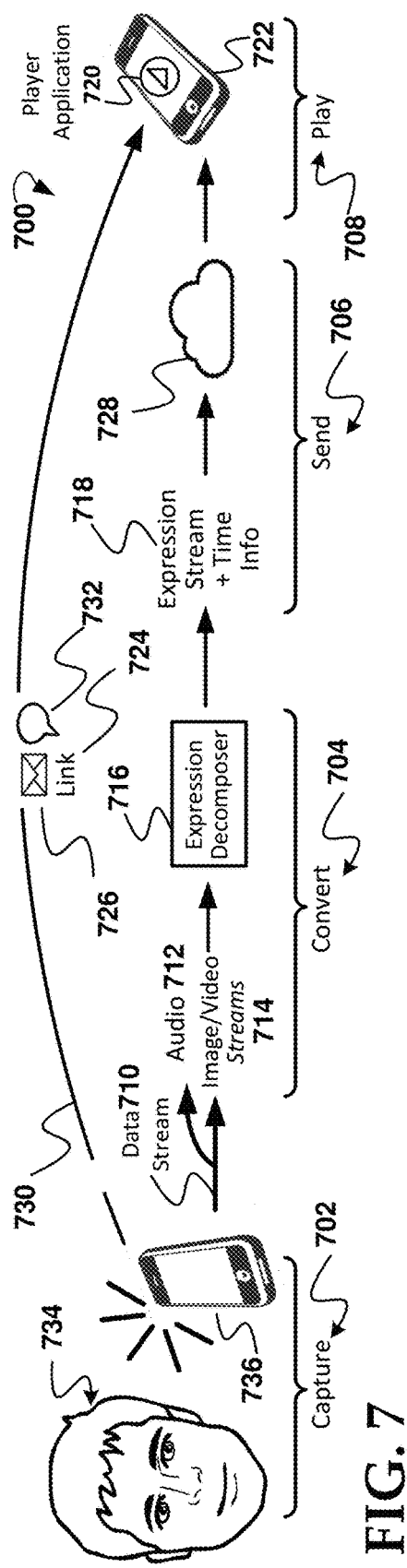
FIG. 7 is an illustration of an exemplary method for creating a dynamically customized animatable 3D model of a virtual character for a user and providing a link to the model to be included in an electronic message to another user.

FIG. 7 is an illustration of an exemplary method 700 for creating a dynamically customized animatable 3D model of a virtual character for a user and providing a link to the model to be included in an electronic message to another user.

More specifically regarding the example in FIG. 7, the aspects include capture 702, convert 704, send 706, and play 708 stages of the exemplary method 700.

For the capture 702 stage, the method may include receiving input from a first user 734, the first user using a mobile device 736, the input being in the form of a data stream 710 that includes at least one of an audio stream 712 and a visual stream, the visual stream including at least one image or video stream 714. The image may be a 2D or 3D photograph or may be a sketch of a person or character, e.g. from a police sketch artist.

In some embodiments, the input is descriptive text, e.g., to accommodate persons with certain disabilities. The method may further include translating the descriptive text into a mesh and topology for customizing the animation of the animatable 3D model. For example, the descriptive text can be used for generation of at least one of an audio stream and a visual stream, and processing can be done on the stream(s) in accordance with other embodiments described herein.

For the convert 704 stage, based on an animatable 3D model and the at least one of an audio stream 712 and the visual stream (see e.g., 714), automatically generating a dynamically customized animation of the animatable 3D model of a virtual character corresponding to the first user, the generating of the dynamically customized animation comprising performing dynamic conversion of the input, in the form of the at least one of an audio stream 712 and a visual stream (see e.g., 714), into an expression stream and corresponding time information (info) 718, using the expression decomposer 716 in this example. In various embodiments, since the animatable 3D model of a virtual character is a computer graphic representation having a geometry or mesh, which may be controlled by a rig or control structure, an animation script may be generated based on the expression(s) determined from the input audio and/or visual stream. The animation script may be encoded onto an encoded stream locally or in the cloud and may be sent to a cloud-based system for performing the customized animation of the animatable 3D model of the user, in real-time. In some embodiments, the animatable 3D model is synced with the user input, and the user input and animation script may be encoded onto an encoded stream that is sent to the cloud-based system to customize movements of the animatable 3D model, and provide the link to the customized animatable 3D model, the link being part of an instant message, for example, that a recipient of the instant message can click on or otherwise select, and have the dynamically customized 3D animatable model being displayed to the recipient. The link may be to a location in the cloud-based system, so that the link can be provided in an instant message, for example, so the recipient can view a 3D model avatar that automatically and dynamically mimics the determined movements of the sender. In some embodiments, it takes only fifteen seconds to create the customizable 3D animatable model of a virtual character (also known as "avatars") of the message sender (see also commonly owned U.S. patent application Ser. No. 15/905,667 for further details regarding creating the customizable animatable 3D model.

This customizable 3D animatable model can be created once for a user and stored in a cloud-based system, for example, and be available to be used many times for dynamically customizing the animation of the 3D animatable model. In various embodiments, this one-time creation substantially reduces the amount of data that must be sent such that only small files for the animation script and/or expression files (e.g., 3D positions) need to be sent. A small file comprising 3D positions can be readily sent at a location that does not provide much bandwidth for electronic communication.

In other embodiments, the created customizable 3D animatable model is downloaded once to the recipient user's device (e.g., mobile device, PC, laptop, etc.) and as the audio and/or visual stream is captured from the message sender, only small files (as mentioned above) would need to be sent, significantly saving bandwidth, reducing latency, etc.

In some embodiments, the customizable 3D animatable model can be mapped to a key of a keyboard (physical or virtual) from which the use can select their customizable 3D animatable model, which can then be customized based on the facial expressions the user makes, as determined by various embodiments described herein. In some embodiments, for the user's most used, favorite, or other selected expressions in a library of expression, the customized animatable 3D models can be mapped to a key on the keyboard such that the user could actuate the key and send that customized 3D animatable model to the recipient, e.g., via a selectable link, in an instant message via an instant messaging service, e.g., Slack™ WhatsApp™, iMessage™, Telegraph™, or other cloud-based instant messaging service, or service provided by a cellular provider. A user may also have multiple customizable 3D animatable models created to provide, in essence, different 3D avatar virtual characters for the same user.

For the send 706 stage, the method may further include, automatically or in response to an action from the first user, generating a selectable link (e.g., 724) for transmission as part of an electronic message (e.g., instant message 726). The selectable link 724 in the electronic message 726 may link to the expression stream and the corresponding time information 718. This may be a link to a cloud computing system (e.g., cloud 728) to which the expression stream and the corresponding time information 718 was transmit or streamed.

In the example in FIG. 7, the path 730 shows at a high level, from the standpoint of a first user 734 and a second user (not shown for space reasons), an instant message 726 including a link 724 plus other content in the instant message 732 which may be included by the first user 734.

At the play 708 stage, automatically or in response to selection of the selectable link by the second user who received the electronic message via a player application 720 on a mobile device 722, causing display of the dynamically customized animatable 3D model to the second user. The second user may be more than one user since, in some embodiments, the instant message in the example may be sent (with the link included) to multiple recipient users of the player application 720. The player application 720 and mobile devices 722 and 736 need not be as shown in the example in FIG. 7, but may take a number of different forms as detailed further in examples herein.

Figure 8:
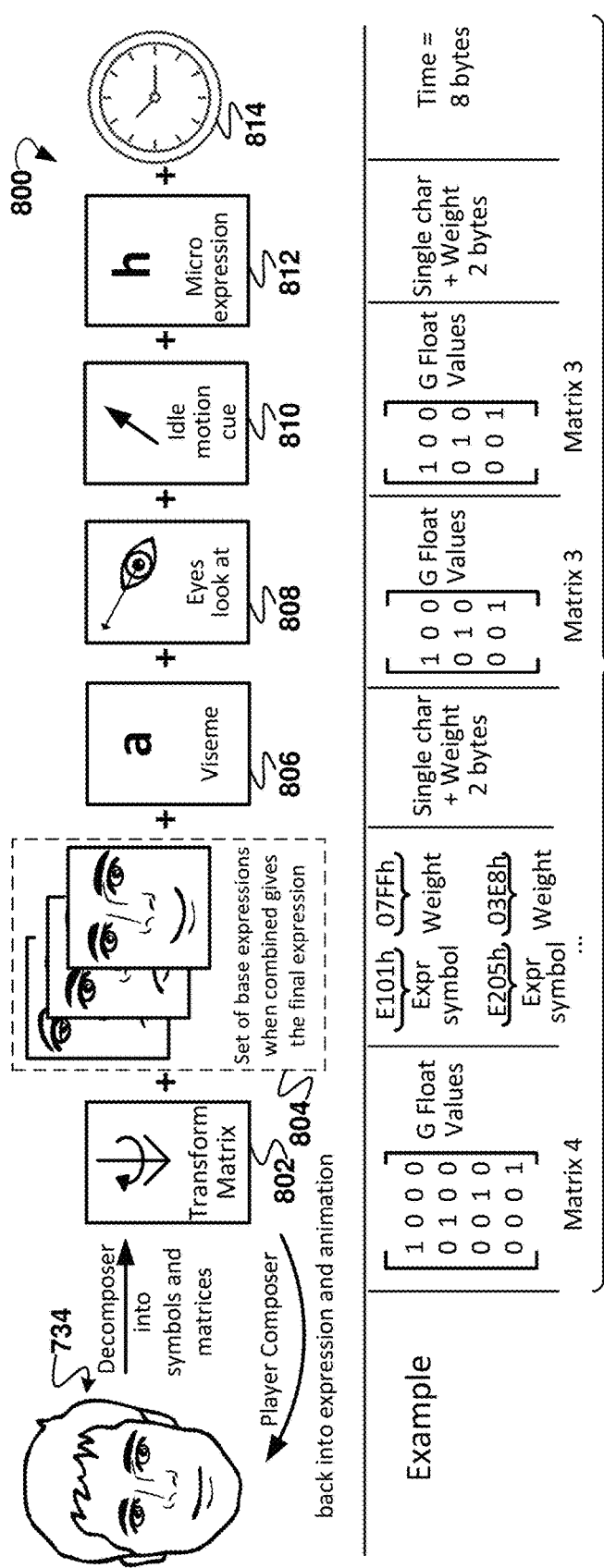
FIG. 8 is a diagram of an example embodiment of method and aspects for the capture and conversion process in FIG. 7.

FIG. 8 is a diagram of an example embodiment of method 800 and aspects for convert 704 stage and aspects of the capture stage 702 of the example method 700 in FIG. 7. The example method 800 includes several stages and aspects including the first user 734, a transform matrix 802, a set of base expressions 804 aspect, a viseme 806 aspect, and "eyes look at" 808 aspect, an "idle motion cue" 810 aspect, a microexpression 812 aspect, and a time 814 aspect. Although the various aspects appear in a certain sequential order left to right in the example in FIG. 8, this is just one example. The various aspects may not necessarily be in this order or be stages performed sequentially. The first user 734 is shown in FIG. 8 to aid in detailing the process. FIG. 8 also provides examples for elements 802, 804, 806, 808, 810 and 812.

Referring to FIG. 7 and FIG. 8, the method 800 is primarily an example process for the convert stage 704 in FIG. 7. In this example, the transform matrix 802 generates a matrix based on decomposition of the captured data stream (710 in FIG. 7) into symbols and one or more matrices. In the example in FIG. 8, the matrix is 4×4, however, the matrix is not limited to that size. From this data stream 710, a player composer overall function for composing/generating the expression and animation dynamically for the 3D animatable model avatar of the first user 734 so as to mimic the expressions of the first user 734 dynamically. The transform matrix values can include floating point numbers and are a standard way to transport and apply mathematical transformations. The 4×4 matrix may contain particular rotation, scaling and translation values. Rotation, scaling and translation are standard features provided in renderers/graphics processing units (GPUs).

In various embodiments, based on the matrix from the transform matrix 802, a selection is made of one or more applicable base expressions 804 from a set of base expressions and a determination is made of a combination of two or more of those base expressions that most closely mimics the expression of the first user 734 per the data stream 710. Machine learning may be used to fine tune the determination. In various embodiments, expression symbols and weights are determined. In some embodiments, the image or video stream (feed) is used to obtain a sort of visual symbol/character approximating the visual appearance of the expression. In some embodiments, this obtaining is not intended to capture the sound related mouth movements, but instead is intended to capture the expression meaning, e.g., happy, sad, etc. The symbol may be the name of the expression, as explained further herein.

Figure 9:
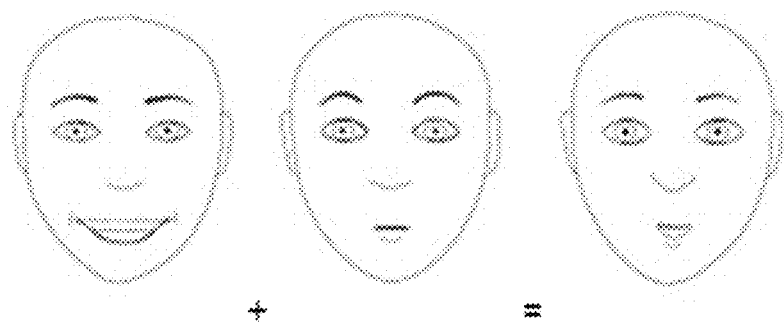
FIG. 9 is an illustration of various examples for combining base expressions according to some embodiments.
Figure 9:
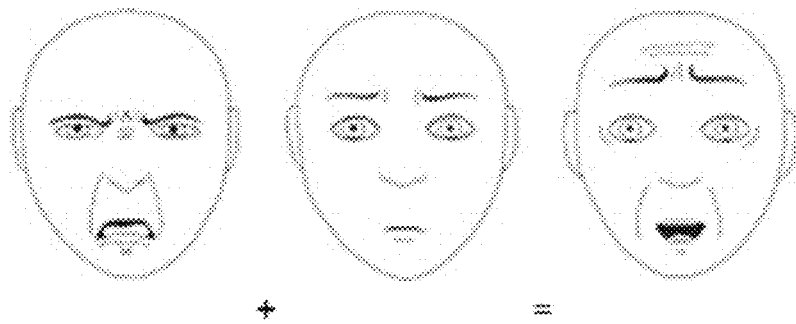
Figure 9:
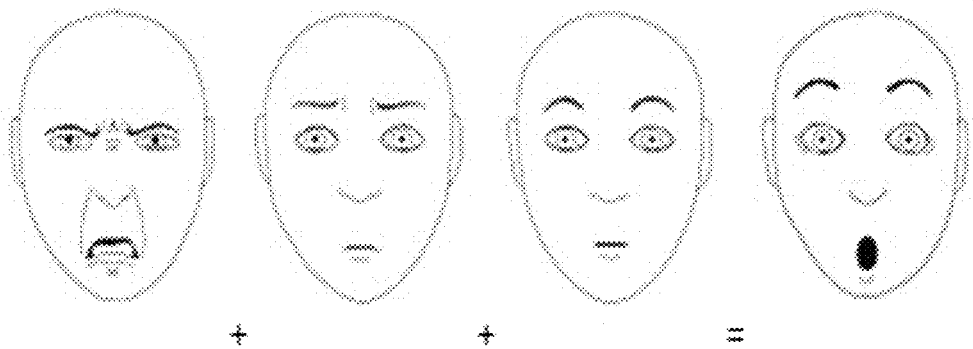

FIG. 9 is an illustration 900 of various examples for combining base expressions according to some embodiments.

The mix of expressions may produce an enormous amount of expressions to be provided to the animatable 3D model. This is because a new expression may be generated by combining at least two expressions. The resulting expression may be combined with another expression, creating another new expression, and so on. The algorithm that may be executed based on a small set of basic facial expressions. The set may vary depending, for example, on whether a particular deployment requires primarily speed (e.g., choosing a speedy, fast solution for which lower resolution is an acceptable tradeoff) or requires primarily high definition (e.g., choosing a high definition solution for which lower speed is an acceptable tradeoff). This small set of basic expressions may be used to create an enormous amount of expressions. In this way, the system and method are constantly learning, with each new expression being made. An intensity (e.g., a weight) may then be applied to each expression or micro expression, and the algorithm may be executed to create a new expression. The algorithm may utilize machine learning. A database of existing facial expression may include some or all of the common base expressions found, for example, at: https://commons.wikimedia.org/wiki/Category:Line_drawings_of_facial_expressions.

For example, if the corner of the mouth is down, that could mean the user is sad. A database may be provided to store all combinations of where the two corners of the mouth, and the corners of the eyebrows fall on a corresponding ellipsoid, see e.g., ellipsoids in FIG. 10 and FIG. 11. The particular combination determined from these corners may indicate the expression since the database will include the relationship. In various embodiments, the method will detect the ellipsoids and will detect where the corners of the mouth are located, and based on the database, determine that the expression is, for example, disappointment.

In some embodiments, the algorithm is not dependent on a database of existing facial expressions, instead, a database may be generated with all possible expressions created from any combination of the six basic facial expressions.

In example 902, a combination of base expressions joy and surprise results in the combined express "amazed". In example 904, a combination of base expressions disgust and fear results in the combined express "frightened". More than two base expressions may be combined, as shown in example 906 where a combination of base expressions disgust, fear, and surprise results in the combined express "shocked". These are just example, other combinations of two or more base expressions can be generated based on the audio and/or image and/or video streams received based on capturing the first user's expressions.

Referring to FIG. 8 and FIG. 7, in various embodiments, the viseme 806 aspect relates to sound. Each particular sound phoneme has a respective viseme in the form of a facial image having a shape the mouth makes when forming the particular sound. For example, the hearing impaired can use visemes for face (including lip) reading to view sounds visually. Based on the audio stream 712, a determination is made of the shape of the mouth for the particular sound in the frame (the values can change frame to frame) and this is used a part of customizing the animation of the 3D model. In the example in FIG. 8, the viseme contribution is represented by a single character+weight, comprising two bytes of data. The weight may represent an intensity. Each viseme is a visual representation of the phoneme where each viseme may be given a particular name or character/symbol. Based on data captured from the audio stream (e.g., sound feed) various embodiments determine weights (e.g., intensities) of all detectable visemes.

In some embodiments, for the "eyes look at" 808 aspect in the example in FIG. 8, a determination is made of at which direction the eyes of the first user may be looking. The customization of the animatable 3D model may be a function of this determination. In the example in FIG. 8, the contribution from the "eyes look at" aspect is represented by a 3×3 matrix of floating point values. A 3×3 matrix typically conveys rotation and scaling. For the eyes, various embodiments use a detected direction of the eyes to modify the focus point of the user in customizing the animatable 3D model of the virtual character corresponding to the user.

In various embodiments, the customization of the animatable 3D model is also a function of an "idle motion cue" 810 aspect. Idle motion refers herein to the type of motion assigned to a virtual character that retains its global position without moving in the 3D environment. Idle motion cues may be based on idle behavior of the first user based on the visual stream. Cues from such idle motion are determined and represented in, for example, a 3×3 matrix of floating point values. For the head, various embodiments use a detected idle position of the head to provide a head reference point for the user in customizing the animatable 3D model of the virtual character corresponding to the user. For example, the head can point in one place and the eyes to another.

In some embodiments, the customization of the animatable 3D model is also a function of a microexpression 812 aspect. In the example in FIG. 8, the micro expression contribution is represented by a single character+weight, comprising two bytes of data. The weight may represent an intensity. In some embodiments, the image or video stream (feed) is used to obtain a sort of visual symbol/character approximating the visual appearance of subtle expressions that are different from general expression. In various embodiments, the subtle expression (e.g., a microexpression) is determined to be an expression that changes a smaller set of facial features per symbol/character. For example, a microexpression can have a full movement of the nose muscles without moving any other muscle in the face. The symbol/character is the name of the microexpression in various embodiments.

Further regarding weights, from a list of expression and its symbols/characters (defined by artists/animators) various embodiments return the weight per each detectable symbol/character; and then record the highest scoring (weights). In various embodiments, each type of symbol/character is detected/evaluated only by its specific processing (e.g., visemes from sound processing, expressions and microexpressions from respective image feed processing). In some embodiments, a detector aspect of the method, based on what it detected from an input stream(s), can provide a list of possible visemes, expressions and micro-expressions detected and their detected weights. Each symbol/character, regardless of its type (e.g., viseme, expression, microexpression, etc.) may visually represent changes in the 3D mesh in the form of differences from rest pose/stage; this is achieved by using a combination of skeletal poses and blendshapes. An example of 3D computer animation used with skeletal animation is described at https://en.wikipedia.org/wiki/Morph_target_animation. In various embodiments, when animating and customizing the animatable 3D model, the symbol/character selects (pose/blendshape) and the weight represents the distance between rest and the defined pose/blendshape.

Referring to FIG. 8, the time 814 aspect is identified and may be represented by a plurality of bytes (eight bytes in the example) in order to provide expression stream and corresponding time information for the expression stream for customizing the 3D animatable model.

The values in the example in FIG. 8 change every frame of the data stream and can be highly compressed for space and processing time considerations.

In some embodiments, for certain ones of the determinations, geometric features are selected from landmarks positions of essential parts of the face (e.g., eyes, eyebrows and mouth) of the first user 734. Using the landmark positions in the image space, two classes of features may be defined: eccentricity and linear features. These features may be normalized so the features are not affected by people anthropometric traits dependencies. Geometric relations among landmark positions can be extracted during emotional expression for people with different ethnicities and ages. In some embodiments, the eccentricity features are determined by calculating the eccentricity of ellipses constructed using specific facial landmarks. Geometrically, the eccentricity can measure how the ellipse deviates from being circular. For ellipses, the eccentricity may be higher than zero and lower than one, being zero if it is a circle. For example, drawing an ellipse using the landmarks of the mouth, it can be seen that while smiling the eccentricity is higher than zero, but when expressing surprise the eccentricity can be closer to a circle and almost zero. A similar phenomenon can be observed also in the eyebrow and eye areas. Therefore, eccentricity may be used to extract new features information and classify facial emotions. In some embodiments, the selected landmarks for this kind of features can be more than a dozen of the set of anthropometric facial landmarks, the set being well known in that art. The total defined eccentricity features may be just eight in some embodiments: two in the mouth region, four in the eye region and two in the eyebrows region. The eccentricity extraction process applied to the mouth region may also be applied to other face areas (eyebrows and eyes).

Figure 10:
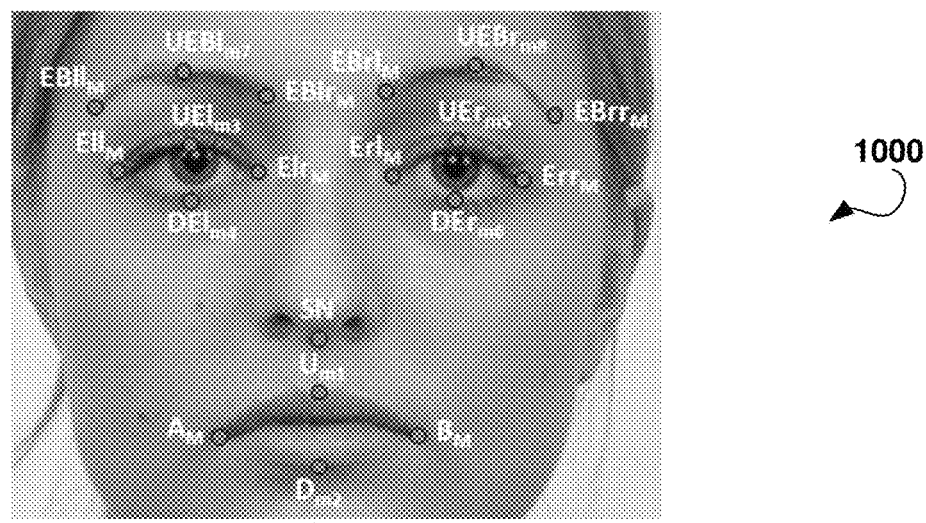
FIG. 10 is an example illustrating various facial landmarks that may be used.
Figure 11:
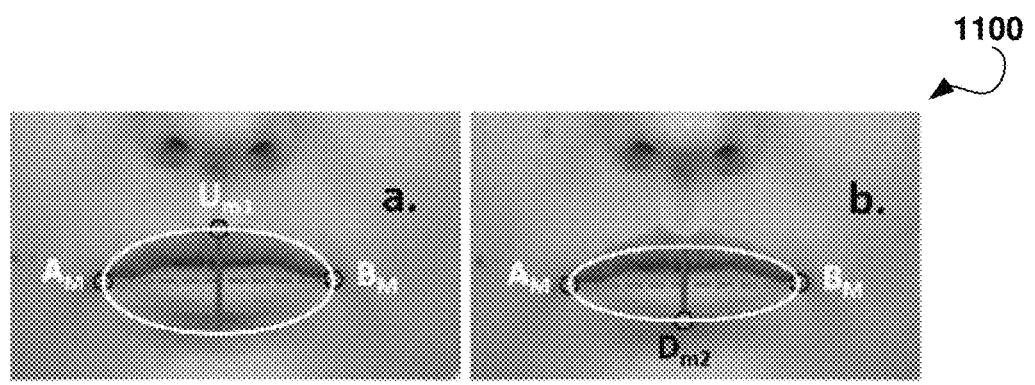
FIG. 11 is an example illustrating various ellipses of the mouth region.

FIG. 10 is an example 1000 illustrating various facial landmarks that may be used. FIG. 11 is an example 1100 illustrating various ellipses of the mouth region. Referring to FIG. 10 and FIG. 11, for example, where $A_M$ and $B_M$ are the end points of the major axis corresponding to the side ends of the mouth, while $U_{m1}$ are the upper end points of the minor axis (the distance between the major axis and $U_{m1}$ corresponds to the semi-minor axis). Symmetry of $U_{m1}$ with respect to $A_M$ and $B_M$ might not be assure, so each ellipse is referred to as the best fitting ellipse among the three points having the semi-minor axis equal to the distance between $U_{m1}$ and the line $A_M B_M$.

A first ellipse E1 ("upper") ellipse may be constructed, defined by the triple $(A_M, B_M, U_{m1})$ and its eccentricity $e_1$ may be calculated. The eccentricity of an ellipse can be defined as the ratio of the distance between the two foci, to the length of the major axis or equivalently:

$$e = \frac{\sqrt{a^2 - b^2}}{a}$$

where $$a = \frac{B_{Mx} - A_{mx}}{2}$$

and $b = A_{My} - U_{M1y}$ are respectively one-half of the ellipse E's major and minor axes, whereas x and y indicate the horizontal and the vertical components of the point in the image space. For an ellipse, the eccentricity may be in the range 0-1. When the eccentricity is 0, the foci may coincide with the center point and the figure is a circle. As the eccentricity tends toward 1, the ellipse can get a more elongated shape. The shape can tend towards a line segment if the two foci remain a finite distance apart and a parabola if one focus is kept fixed as the other is allowed to move arbitrarily far away. The process can be repeated for ellipse $E_2$ ("lower" ellipse), using the lower end of the mouth (see b in FIG. 11). The other six ellipses may then be constructed following the same or similar extraction process. For both eyebrows, the lower ellipses may be incalculable due to their morphology.

Figure 12:
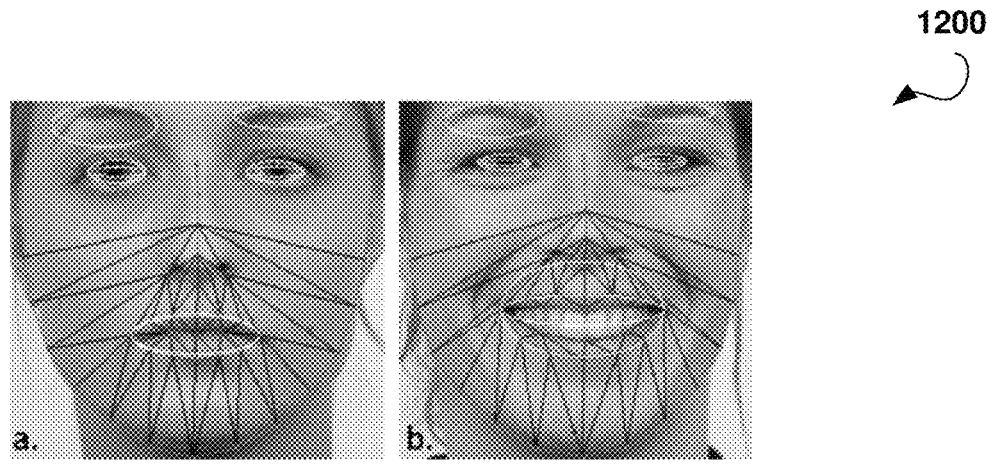
FIG. 12 illustrates an example of the final results of the ellipse construction.

FIG. 12 illustrates an example 1200 of the final results of the ellipse construction in part "a", and in part "b", it is illustrated how the eccentricities of the facial ellipses changes according to the person's facial emotion.

For the linear features, a determination may be made by calculating linear distances between couples of landmarks normalized with respect to a physiologically greater facial inter-landmark distance. These distances may intend to quantitatively evaluate the relative movements between facial landmarks while expressing emotions. The selected distances can be those corresponding to the movements between eyes and eyebrows $L_1$, mouth and nose $L_2$ and upper and lower mouth points $L_3$. Referring to various landmarks in FIG. 10, three linear features may be calculated as $$L_1 = \overline{UEBl_{m7y}UEl_{m3y}}/DEN; \qquad 1.$$

$$L_2 = \overline{U_{m1y}SN_y}/DEN; \qquad 2.$$

$$L_3 = \overline{D_{m2y}SN_y}/DEN; \qquad 3.$$

indicating with _y only the vertical component of each point in the image space and selecting as $DEN = \overline{UEI_{m3y}SN_y}$ the normalizing distance. Thus, this example method uses a real-time face tracker output to define and extract eccentricity and linear features. The eccentricity and linear features may then be used to train a machine learning classifier, which can result in a processing pipeline that allows classification of the six basic Ekman's emotions (plus Contemptuous and Neutral) in real-time, without requiring any manual intervention or prior information of facial traits.

Figure 13:
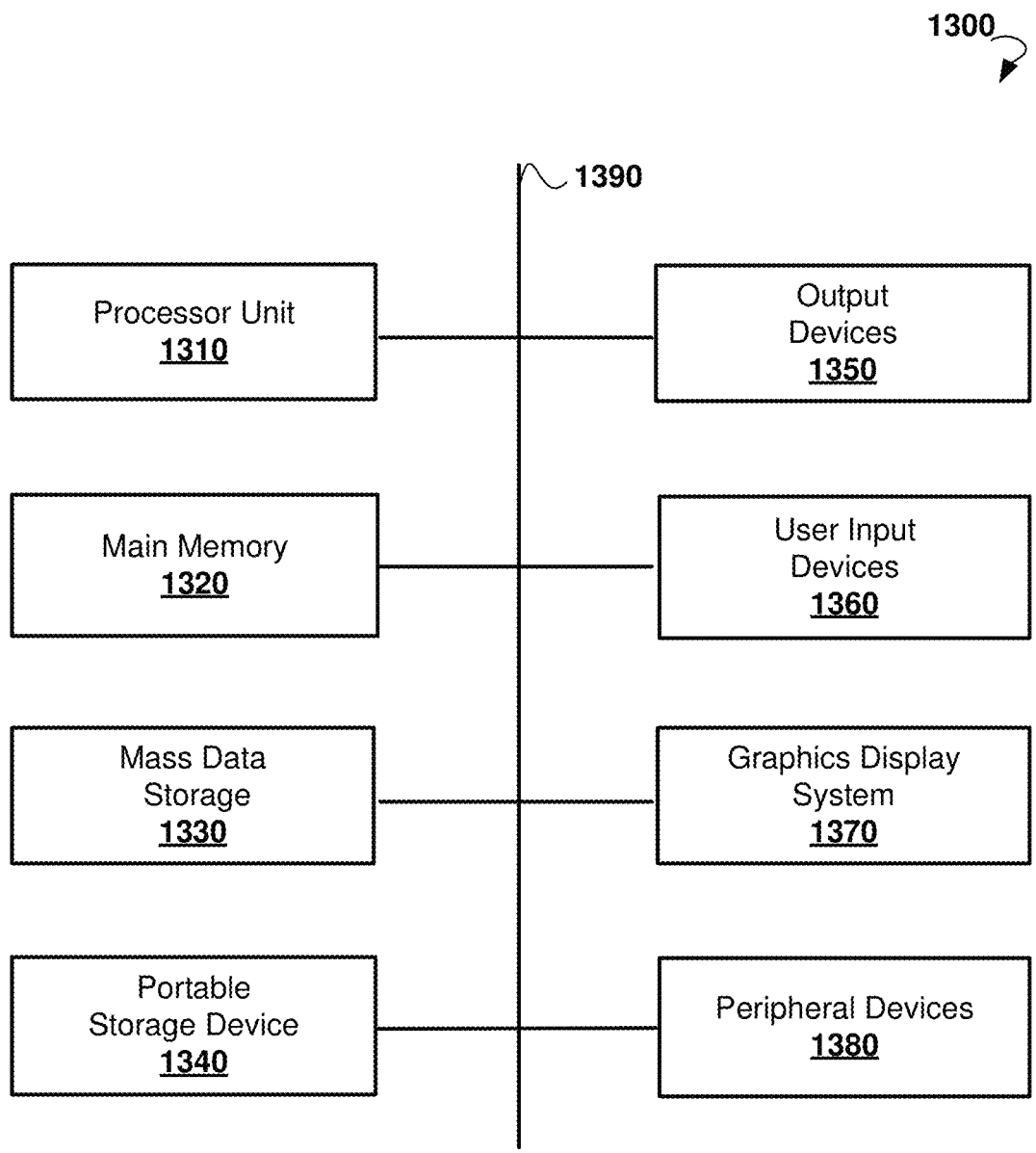
FIG. 13 is a schematic diagram of an example computer device that can be utilized to implement aspects of various embodiments of the present disclosure.

FIG. 13 illustrates an exemplary computer system 1300 that may be used to implement some embodiments of the present technology. Computer system 1300 may be implemented in the contexts of the likes of computing systems such as server system 608 and client 602. Computer system 1300 includes one or more processor units 1310 and main memory 1320. Main memory 1320 stores, in part, instructions and data for execution by processor units 1310. Main memory 1320 stores the executable code when in operation, in this example. Computer system 1300 further includes a mass data storage 1330, portable storage device 1340, output devices 1350, user input devices 1360, a graphics display system 1370, and peripheral devices 1380.

The components shown in FIG. 13 are depicted as being connected via a single bus 1390. The components may be connected through one or more data transport means. Processor unit 1310 and main memory 1320 are connected via a local microprocessor bus, and the mass data storage 1330, peripheral device(s) 1380, portable storage device 1340, and graphics display system 1370 are connected via one or more input/output (I/O) buses.

Mass data storage 1330, which can be implemented with a magnetic disk drive, solid state drive, or an optical disk drive, is a non-volatile storage device for storing data and instructions for use by processor unit 1310. Mass data storage 1330 stores the system software for implementing embodiments of the present disclosure for purposes of loading that software into main memory 1320.

Portable storage device 1340 operates in conjunction with a portable non-volatile storage medium, such as a flash drive, floppy disk, compact disk, digital video disc, or USB storage device, to input and output data and code to and from computer system 1300. The system software for implementing embodiments of the present disclosure is stored on such a portable medium and input to computer system 1300 via portable storage device 1340.

User input devices 1360 can provide a portion of a user interface. User input devices 1360 may include one or more microphones, an alphanumeric keypad, such as a keyboard, for inputting alphanumeric and other information, or a pointing device, such as a mouse, a trackball, stylus, or cursor direction keys. User input devices 1360 can also include a touchscreen. Additionally, computer system 1300 includes output devices 1350. Suitable output devices 1350 include speakers, printers, network interfaces, and monitors.

Graphics display system 1370 include a liquid crystal display (LCD) or other suitable display device. Graphics display system 1370 is configurable to receive textual and graphical information and processes the information for output to the display device. Peripheral devices 1380 may include any type of computer support device to add additional functionality to the computer system.

The components provided in computer system 1300 are those typically found in computer systems that may be suitable for use with embodiments of the present disclosure and are intended to represent a broad category of such computer components that are well known in the art. Thus, computer system 1300 can be a personal computer (PC), hand held computer system, telephone, mobile computer system, workstation, tablet computer, mobile phone, server, minicomputer, mainframe computer, wearable computer, or any other computing system. The computer may also include different bus configurations, networked platforms, multi-processor platforms, and the like.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, computer system 1300 may be implemented as a cloud-based computing environment, such as a virtual machine operating within a computing cloud. In other embodiments, computer system 1300 may itself include a cloud-based computing environment, where the functionalities of the computer system 1300 are executed in a distributed fashion. Thus, computer system 1300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as computer system 1300, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for creating a customized animatable 3D model for use in an electronic communication between at least two users, the method comprising:
    receiving, via a camera associated with a mobile device, an input from a first user, the first user using the mobile device, the input being in the form of at least one of an audio stream and a visual stream, the visual stream including at least one image or video;
    decomposing the input into a plurality of facial expressions of the first user;
    selecting, using one or more control point matrices and a template geometry of an animatable 3D model and based on the plurality of facial expressions, one or more base facial expressions from a set of base expressions, the one or more base facial expressions mimicking the plurality of facial expressions of the first user;
    based on the animatable 3D model and the input, automatically generating a dynamically customized animation of the animatable 3D model of a virtual character corresponding to the first user, the generating of the dynamically customized animation comprising:
        deforming, based on the one or more base facial expressions, the template geometry into a custom geometry, the custom geometry having the one or more base facial expressions; and
        performing dynamic conversion of the input, into an expression stream and corresponding time information, the expression stream including the one or more base facial expressions associated with the custom geometry;
    generating a selectable link for transmission as part of an electronic message, the selectable link linking to the expression stream and the corresponding time information; and
    causing display, to a second user, of the dynamically customized animation of the animatable 3D model of the virtual character corresponding to the first user.

2. The method of claim 1, wherein the electronic message is an instant message comprising a text portion in addition to the selectable link.

3. The method of claim 1, wherein the dynamic conversion includes performing normalization of lighting and illumination for at least some of the at least one image or video in the visual stream.

4. The method of claim 1, wherein active movements derived from the input, in the form of the at least one of the audio stream and the visual stream, are used for the dynamic conversion into the expression stream and the corresponding time information.

5. The method of claim 1, wherein, for the generating of the dynamically customized animation comprising the performing dynamic conversion of the input, the dynamic conversion, of the input from the first user into the expression stream and the corresponding time information, includes determining the one or more base facial expressions corresponding to the visual stream.

6. The method of claim 1, wherein the generating of the dynamically customized animation comprising the performing dynamic conversion of the input is performed frame by frame.

7. The method of claim 5, wherein, for the generating of the dynamically customized animation comprising the performing dynamic conversion of the input, the dynamic conversion further comprising dynamically generating the expression stream at least in part by dynamically determining combinations of two or more of the base expressions from at least one of the audio stream and the visual stream.

8. The method of claim 5, wherein for the generating of the dynamically customized animation comprising the performing dynamic conversion of the input, the dynamic conversion further comprises dynamically generating the expression stream at least in part by dynamically determining combinations of three base expressions from the visual stream.

9. The method of claim 8, wherein for the generating of the dynamically customized animation comprising the performing dynamic conversion of the input, the dynamic conversion further comprises determining certain movements to apply to the animatable 3D model based on a viseme determined based on the audio stream.

10. The method of claim 8, wherein, for the generating of the dynamically customized animation comprising the performing dynamic conversion of the input, the dynamic conversion further comprises determining certain movements to apply to the animatable 3D model based on determining a direction, from the visual stream, at least one eye of the first user is looking.

11. The method of claim 8, wherein, for the generating of the dynamically customized animation comprising the performing dynamic conversion of the input, the dynamic conversion further comprises determining motion cues based on idle behavior of the first user based on the visual stream.

12. The method of claim 1, wherein the dynamically converting further comprises determining at least one micro-expression, from a frame of the visual stream, comprising determining weights to changes detected in the frame of the visual stream from at least a prior frame of the visual stream, in the face of the first user.

13. The method of claim 1, further comprising receiving the animatable 3D model of the virtual character corresponding to the first user, the animatable 3D model being customizable such that the customized animatable 3D model can be generated therefrom.

14. The method of claim 1, wherein the animatable 3D model is customizable such that the customized animatable 3D model can be generated therefrom, and the animatable 3D model is:
downloaded, for customization processing, from a cloud-based system to the mobile device of the second user.

15. The method of claim 1, wherein the animatable 3D model is customizable such that the customized animatable 3D model can be generated therefrom, and the animatable 3D model is:
customized on a cloud-based system such that the animatable 3D model need not be downloaded or transmitted to the mobile device of the second user.

16. The method of claim 1, wherein the input is further received via a microphone of the mobile device, the input causing generation of the visual stream and the audio stream, respectively, on the mobile device.

17. The method of claim 1, wherein the visual stream comprises a video comprising a plurality of captured images.

18. The method of claim 1, wherein a frame of the visual stream comprises a photo.

19. The method of claim 1, wherein the input is in the form of descriptive text, the descriptive text being used for generation of the at least one of the audio stream and the visual stream.

20. The method of claim 1, wherein the generating the selectable link is performed automatically or in response to an action from the first user.

21. The method of claim 1, wherein the animatable 3D model is one of a plurality of animatable models that is created for the first user; the first user selecting which of the plurality of animatable models to be customized based on user input during the electronic messaging.

22. The method of claim 1, wherein the 3D animatable model or the customized 3D animatable model making certain expressions is mapped to a keyboard so as to be selectable by the first user.

23. The method of claim 1, wherein the causing display is performed automatically or in response to an action from the second user.

24. A system for creating a customized animatable 3D model for use in an electronic message, the system comprising:
a processor; and
a memory for storing executable instructions, the processor executing the instructions to:
receive, via a camera associated with a mobile device, an input from a first user, the input being in the form of at least one of an audio stream and a visual stream;
decompose the input into a plurality of facial expressions of the first user;
select, using one or more control point matrices and a template geometry of an animatable 3D model and based on the plurality of facial expressions, one or more base facial expressions from a set of base expressions, the one or more base facial expressions mimicking the plurality of facial expressions of the first user;
based on the animatable 3D model and the input, automatically generate a dynamically customized animation of the animatable 3D model of a virtual character corresponding to the first user, the generating comprising:
deforming, based on the one or more base facial expressions, the template geometry into a custom geometry, the custom geometry having the one or more base facial expressions; and
performing dynamic conversion of the input into an expression stream and corresponding time information, the expression stream including the one or more base facial expressions associated with the custom geometry;
generate a selectable link for transmission as part of an electronic message, the selectable link linking to the expression stream and the corresponding time information; and
cause display of the dynamically customized animatable 3D model to a second user.

* * * * *